United States Patent

Johnson

[11] Patent Number: 6,010,409
[45] Date of Patent: Jan. 4, 2000

[54] VENTING CONSTANT VELOCITY JOINT

[75] Inventor: Rory Matthew Johnson, Grand Blanc, Mich.

[73] Assignee: GKN Automotive, Inc., Auburn Hills, Mich.

[21] Appl. No.: 09/007,909

[22] Filed: Jan. 15, 1998

[51] Int. Cl.[7] .................................................. F16D 3/20
[52] U.S. Cl. ........................ 464/133; 464/173; 277/433; 277/928; 137/47
[58] Field of Search ..................... 464/173, 170, 464/111, 133, 905; 277/928, 433, 634; 137/47, 53, 56

[56] References Cited

U.S. PATENT DOCUMENTS

| | | | |
|---|---|---|---|
| 1,803,510 | 5/1931 | Schmieding et al. | 277/928 |
| 2,662,536 | 12/1953 | Martiniak et al. | 137/56 |
| 4,188,780 | 2/1980 | Penny | 137/56 |
| 4,265,265 | 5/1981 | Wallace et al. | 137/56 |
| 4,319,467 | 3/1982 | Hegler et al. | 464/111 |
| 4,417,880 | 11/1983 | Kumagai et al. | 464/111 |
| 4,436,310 | 3/1984 | Samabe et al. | 464/111 |
| 4,541,817 | 9/1985 | Sawabe et al. | 464/111 |
| 4,995,620 | 2/1991 | Zawaski et al. | 277/433 |

*Primary Examiner*—Eileen Dunn Lillis
*Attorney, Agent, or Firm*—Mick A. Nylander

[57] ABSTRACT

A vent regulator device adapted for use in a constant velocity joint including a housing having an inner surface defining an inner cavity. The inner surface includes an annular portion, and a domed portion which has a relatively small vent hole centrally located therein. The vent regulator device further includes a member having a first end and a second end where the first end is mounted to the inner surface of the housing and the second end is disposed proximate the vent hole. When the constant velocity joint is in one of either a static state and an active state rotating at speeds below a predetermined threshold, the vent hole is overlappingly covered by the first end of the member, thereby preventing grease from penetrating the hole. Moreover, when the constant velocity joint is in an active state rotating at speeds above the predetermined threshold, centrifugal forces cause the second end of the member to move away radially from the vent hole to allow venting of air therethrough.

17 Claims, 2 Drawing Sheets

U.S. Patent  Jan. 4, 2000  Sheet 1 of 2  6,010,409
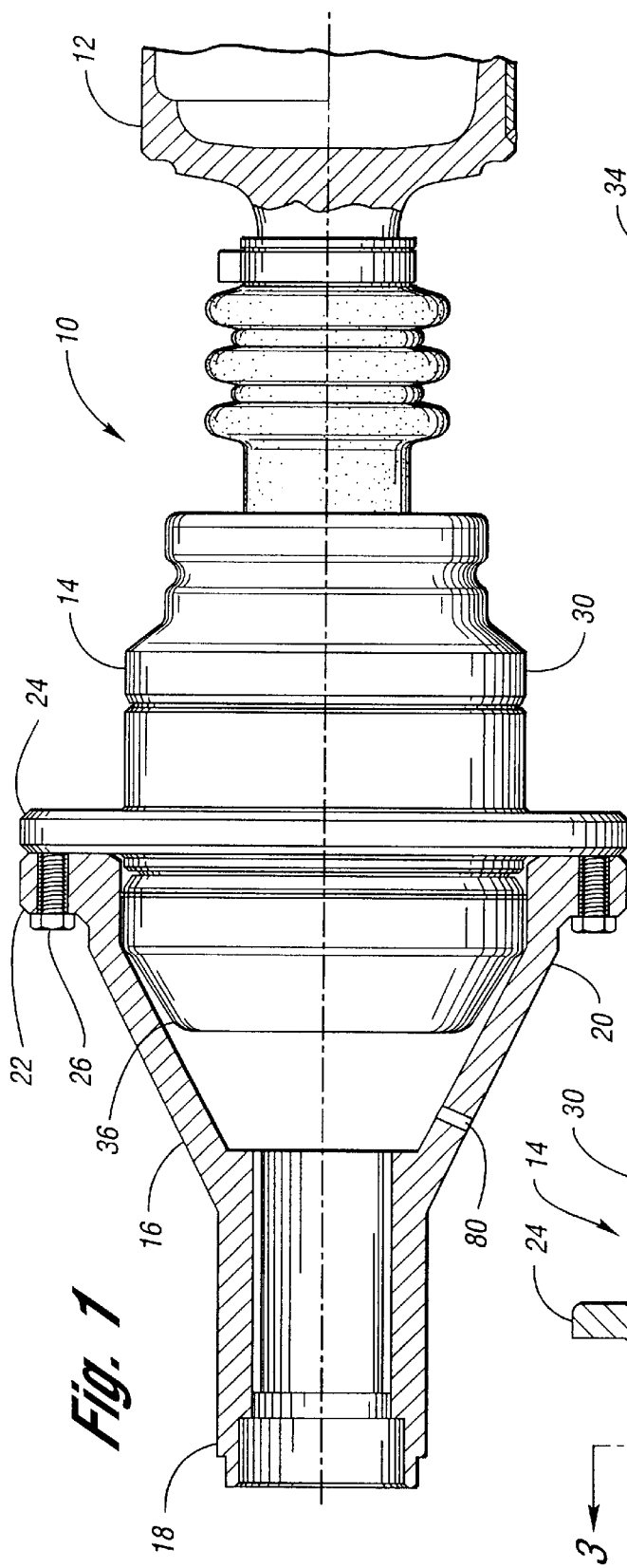
Fig. 1
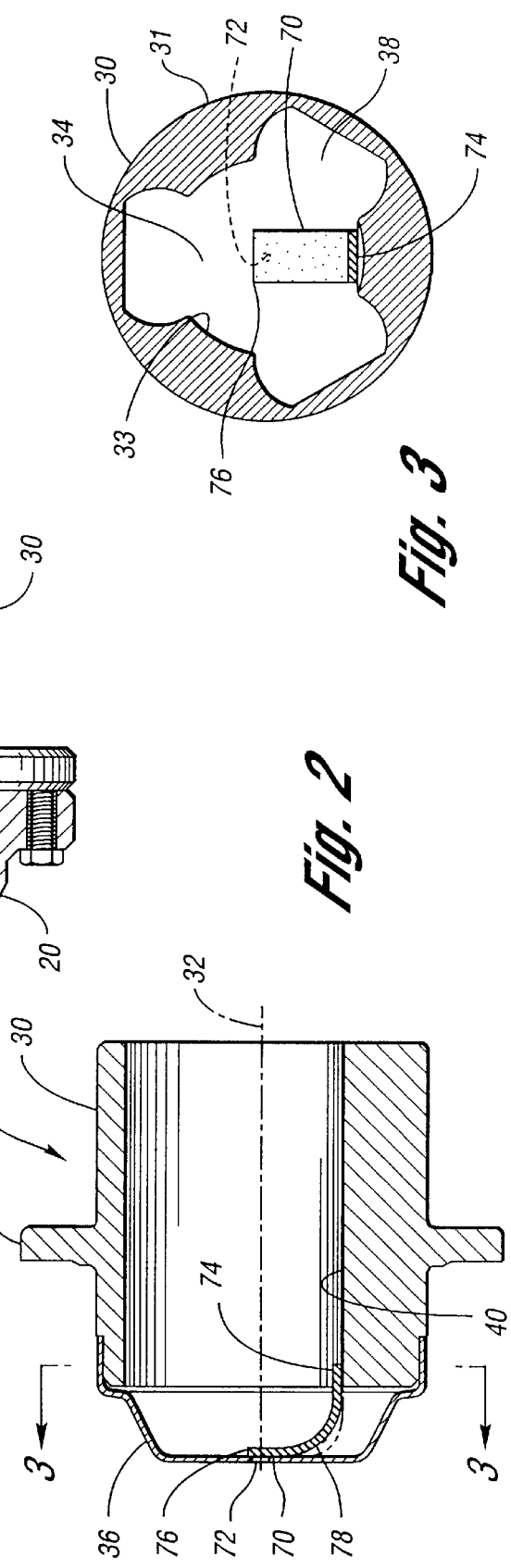
Fig. 3
Fig. 2

VENTING CONSTANT VELOCITY JOINT

TECHNICAL FIELD

This invention relates to an improved venting constant velocity universal joint.

BACKGROUND ART

Constant velocity universal joints are well known in the art and are employed where transmission of a constant velocity rotary motion is desired or required. The tripod joint is characterized by a bell-shaped outer race (housing) disposed around an inner spider joint which travels in channels formed in the outer race. The spider-shaped cross section of the inner joint is descriptive of the three equispaced arms extending therefrom which travel in the tracks of the outer race. Part spherical rollers are featured on each arm.

One common type of constant velocity universal joint is the plunging tripod type, characterized by the performance of end motion in the joint. Plunging tripod joints are currently the most widely used inboard (transmission side) joint in front wheel drive vehicles, and particularly on the propeller shafts found in rear-wheel drive, all-wheel drive and four-wheel drive vehicles. Another common feature of tripod universal joints is their plunging or end motion character. Plunging tripod joints allow axial movement during operation without the use of splines which sometimes provoke significant reaction forces thereby resulting in a source of vibration and noise.

Tripod constant velocity joints are generally grease lubricated for life and sealed by an elastomeric sealing boot when used on some drive shafts. Most constant velocity universal joints are sealed in order to retain grease inside the joint while keeping contaminants and foreign matter, such as dirt and water, out of the joint. In order to achieve this protection, the constant velocity joint is usually enclosed at the open end of the outer race by a sealing boot made of rubber, thermoplastic or urethane. The opposite end of the outer race is sometimes formed by an enclosed "dome" known in the art as the greasecap. Such sealing and protection of the constant velocity joint is necessary because, once the inner chamber of the outer joint is partially-filled and thus lubricated, it is generally lubricated for life.

It is often necessary to vent the constant velocity joint in order to minimize air pressure fluctuations due to expansion and contraction of the air within the joint during operation of the joint. This is especially true in the case of a tripod-type constant velocity joints. Typically, constant velocity joints are vented by placing a small hole generally in the center of the greasecap. This allows for the passage of air in and out of the joint as needed, in order to prevent pressure buildup which occurs during operation of the joint.

However, when the constant velocity joint is in a static state and not rotating, grease may settle in the vent hole, blocking it and hindering its function. This condition may create a pressure buildup and possibly result in joint failure due to a ruptured boot, among other things. During this static state, grease may also flow from the vent hole and out of the joint, thereby resulting in the loss of grease from the joint. This loss of lubricant could possibly lead to more frequent relubrication and maintenance, and eventually possible replacement, of the joint. This is especially true in constant velocity joints with large filling masses of grease where, in a static state, the joint has a relatively large amount of grease stored therein which could flow out of a vent hole. This condition may equally occur when the constant velocity joint is in operation, but only at relatively low speeds.

U.S. Pat. No. 4,319,467 issued to Hegler et al. discloses a seal vent subassembly press fitted into the collar bore of a universal joint. The subassembly includes a vent disc which is nested in a seal disc to form a venting arrangement to the exterior of the housing by way of various holes and chambers. However, this vent hole may still be subject to grease buildup during a static state or operative state.

Consequently, an improved constant velocity joint design is provided which allows for reliable venting of the joint when large quantities of grease are contained therein, which also allows the vent to remain protected from grease buildup when the joint is in a static state or rotating at low speeds, and which facilitates venting when the joint rotates at high speeds.

BRIEF SUMMARY OF THE INVENTION

It is an object according to the present invention to provide a system for venting a constant velocity joint without a loss of grease or other internal joint lubricant.

It is another object according to the present invention to provide a system for preventing grease buildup in a vent hole of a constant velocity joint.

It is still a further object according to the present invention to provide a constant velocity joint which includes a vent regulator for effectively venting the joint based on the speed of the joint.

In carrying out the above objects, features and advantages of the present invention, provided is a vent regulator device which is adapted for use in a constant velocity joint which has a housing with an inner surface defining an inner cavity. The inner surface includes an annular portion and a domed portion. The domed portion has a relatively small vent hole centrally located therein.

The vent regulator device includes a member having a first end and a second end. The first (or fixed) end of the member is mounted to the annular portion of the inner surface of the housing. The second (or free end) of the member is disposed proximate the vent hole. Thus when the constant velocity joint is in one of either a static state and an active state rotating at speeds below a predetermined threshold, the free end of the member covers the vent hole which prevents grease from exiting the hole. On the other hand, when the constant velocity joint is in an active state and rotating at speeds above the predetermined threshold, centrifugal forces cause the free end of the member to move radially away from the vent hole to allow venting of air therethrough.

Further provided as part of the present invention herein is a constant velocity joint assembly which includes an outer race defining a cavity therein and which further has an exterior surface and an interior surface. The interior surface defines an annular portion and a domed portion, where the domed portion has a relatively small vent hole formed therein. Further included in the constant velocity joint assembly is an inner joint disposed within the cavity and which is rotatable relative to the outer race.

There is also provided in the constant velocity joint assembly a member having a first end attached to the annular portion and a second end disposed proximate the domed portion, so that when the constant velocity joint is in one of either a static state and an active state rotating at speeds below a predetermined threshold, the second end covers the vent hole which prevents ingress or egress of air therethrough. Also, when the inner race is in an active state rotating at speeds above a predetermined threshold, centrifugal forces act on the regulator causing the second end to move radially from the vent hole to allow venting of air pressure from the cavity of the constant velocity joint.

Also disclosed herein is a propeller shaft assembly for a motor vehicle which includes a propeller shaft having an end and at least one plunging, tripod constant velocity joint articulatably mounted to the propeller shaft end. The plunging, tripod constant velocity joint includes an outer race having three circumferentially distributed longitudinally extending, axis-parallel recesses, each recess having a pair of oppositely disposed longitudinal tracks, the outer race an interior surface defining an annular portion and a domed portion, the domed portion having a relatively small vent hole formed therein.

The plunging, tripod constant velocity joint also includes an inner joint disposed within the outer race, the inner joint having a cross section with three circumferentially distributed radially extending arms, each arm corresponding to a respective recess and radially extending into a respective recess between the oppositely disposed longitudinal tracks.

Further, the plunging, tripod constant velocity joint of the propeller shaft assembly includes a roller assembly on each arm, each roller assembly rollingly engaged with the longitudinal track of the outer race and axially and angularly movable relative to an arm axis. Moreover, the plunging, tripod constant velocity joint includes a regulator having a fixed end mounted to the interior surface and a free end disposed adjacent the vent hole.

The plunging, tripod constant velocity joint of the propeller shaft assembly includes these features such that, when the inner joint is in one of either a static state and an active state rotating at speeds below a predetermined threshold, the free end covers the vent hole preventing ingress or egress of air therethrough. On the other hand, when the inner joint is in an active state rotating at speed above a predetermined threshold, centrifugal forces act on the regulator causing the fixed end to move radially from the vent hole to allow venting of air pressure from the interior of the constant velocity joint.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1 is a partial side sectional elevational view of a first embodiment of a tripod-type constant velocity joint according to the present invention in association with a propeller shaft;

FIG. 2 is a side sectional view of a housing of a first embodiment of a tripod-type constant velocity joint in a state operating below a predetermined threshold, according to the present invention;

FIG. 3 is a sectional view of the constant velocity joint according to the present invention, taken along line 3—3 of FIG. 2;

BEST MODE FOR CARRYING OUT THE INVENTION

Figure 4:
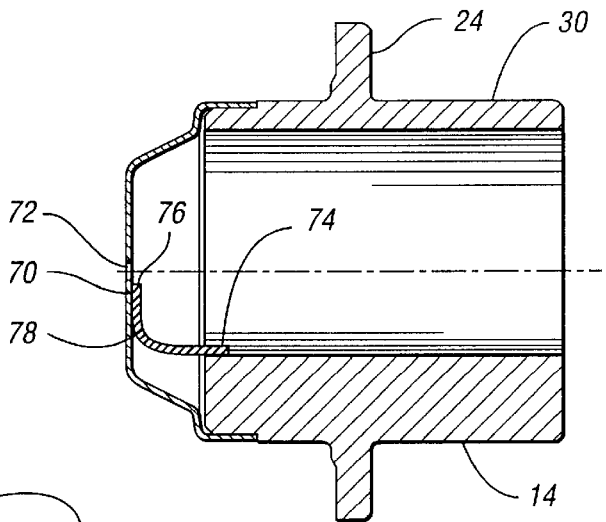
FIG. 4 is a side sectional view similar to that shown in FIG. 2 but illustrating the tripod-type constant velocity joint in a state operating above a predetermined threshold.

Referring to FIG. 1 of the drawings, shown therein is a partial side-view of a propeller shaft assembly 10 (or drive shaft assembly) for use in a motor vehicle in conjunction with the drive line of the vehicle (not shown). Propeller shaft assembly 10 includes a propeller shaft 12 which is mounted to a constant velocity universal joint 14 in a manner such that constant velocity universal joint 14 is able to articulate in relation to propeller shaft 12, as is well-known in the art. Constant velocity joint 14 is typical of that provided as part of a propeller shaft assembly 10 (or drive shaft, partially shown in FIG. 1) for use on rear-wheel drive, all-wheel drive and four-wheel drive vehicles.

Propeller shaft assembly 10 attaches to the differential of the drive line (not shown herein) and gives power to the side shafts (also not shown) of the motor vehicle. Propeller shaft assembly 10 attaches to the differential of the drive line through utilization of an adaptor 16. As is well known in the art, adaptor 16 is commonly press fit into the differential to keep runout low, and is held in place by a nut (not shown). Specifically as shown in FIG. 1, constant velocity joint 14 of propeller shaft assembly 10 is shown received by and attached to adaptor 16. Propeller shaft 12 itself may be a two-piece construction commonly used in front-engine rear-wheel drive vehicles.

Note that constant velocity joint 14 illustrated in FIGS. 1–5 of the drawings and discussed herein is of the plunging tripod-type (or telescopic) variety. However, this type of constant velocity joint 14 is shown for illustrative and discussion purposes only, as it is contemplated that the teachings according to the present invention are applicable to any type of constant velocity joint where venting of the joint is desirable or necessary. Other such constant velocity joints may include a cross-groove joint, a fixed joint, a fixed tripod joint or a double offset joint, as those terms are commonly known in the art.

As previously stated, further shown in FIG. 1 is an adaptor 16 mated with constant velocity joint 14. Adaptor 16 is a conduit which fits into an adjoining differential (not shown) at one end 18 and receives constant velocity joint 14 of propeller shaft assembly 10 at other end 20. The adaptor may connect to a transfer case, power take-off unit or transmission depending on the type and design of the vehicle. Particularly, adaptor 16 has a flange 22 which mates with and attaches to a corresponding flange 24 on constant velocity joint 14, shown attached via bolts 26. The adaptor 16 and constant velocity joint 14 may be affixed to each other by any known means, such as having the flanges threaded and using mating bolts. Thus, adaptor 16 provides a conduit by which constant velocity joint 14 and adjoining propeller shaft 12 may articulate with respect to the drive line. Plunging or telescopic joints are used in propeller shaft assemblies like that designated as reference numeral 10, so that it accommodates small variations in effective length of the drive line.

Referring now to FIG. 2, illustrated therein is a cross-sectional view of the outer race 30 of constant velocity joint 14. As shown in FIGS. 1–3, the outer race 30 is substantially annular in shape. Outer race 30 is rotatable about an axis 32. The outer race 30 includes an outer surface 31, and an inner surface 33 which defines an inner cavity 34. Outer race 30 also includes a dome portion 36 which is commonly referred to in the art as a greasecap, best shown in FIGS. 1–2 and 4–5.

Figure 5:
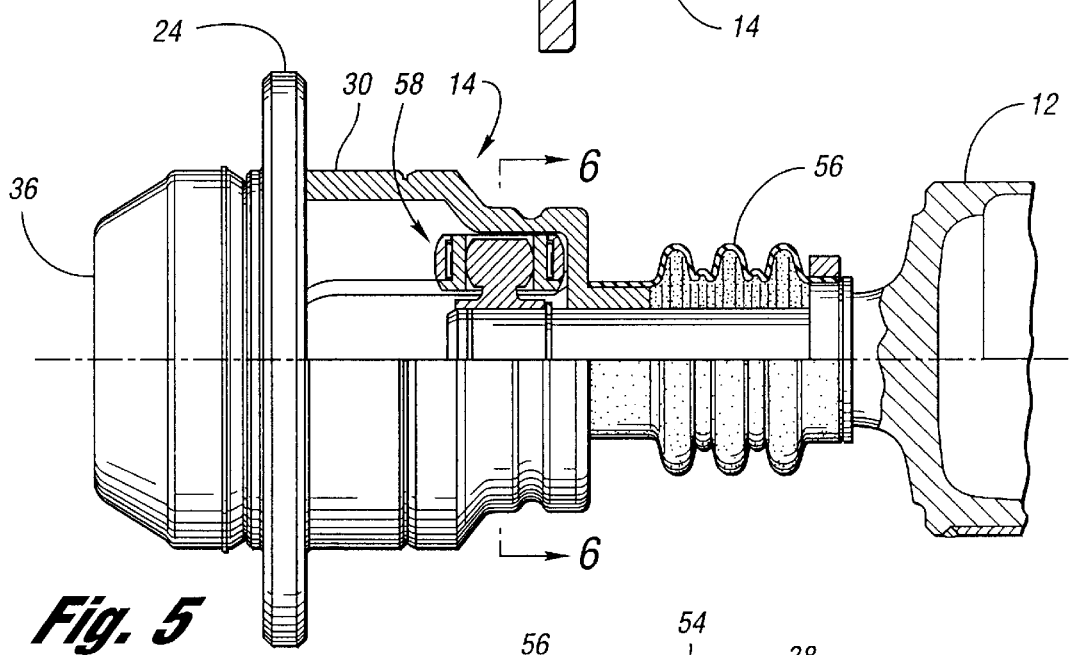
FIG. 5 is partial side sectional view of a constant velocity joint according to the present invention illustrating the inner joint assembly.
Figure 6:
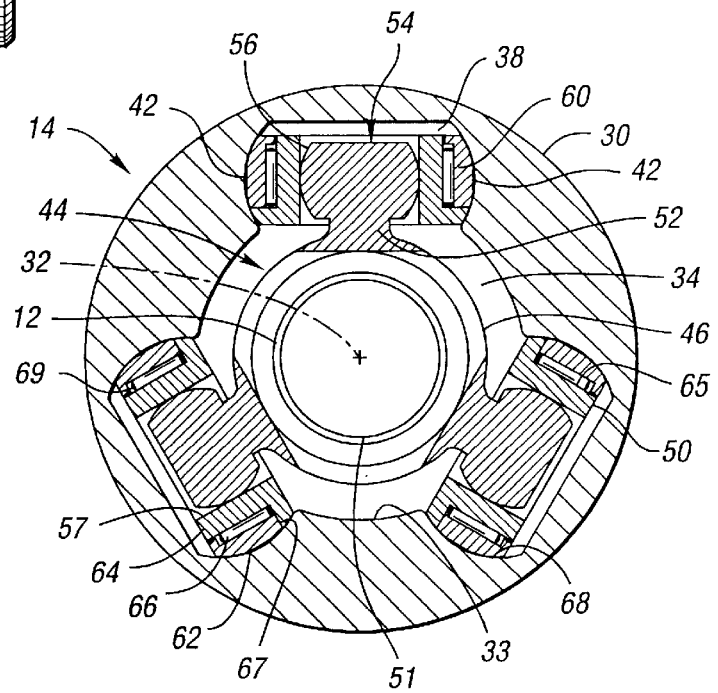
FIG. 6 is a sectional view of the constant velocity joint of FIG. 5 illustrating the inner joint, outer joint and joint cavity, taken along line 6—6 of FIG. 5.

Referring now to FIGS. 5–6, cavity 34 has three longitudinal, equispaced and circumferentially distributed recesses 38 formed in interior surface 33 of outer race 30. Each recess 38 is longitudinally extending and is also generally parallel to axis 32. As is best shown in FIG. 6, each recess 38 forms a pair of longitudinal opposed tracks 42 which are also generally parallel to axis 32. Further included in constant velocity joint 14 is a substantially annular inner joint assembly 44 which is disposed within cavity 34 of outer race 30.

Inner joint assembly 44 includes an inner race 46 (or spider joint), and a roller assembly 50. Inner joint assembly 44 has an opening 51 longitudinally defined therethrough for receiving the propeller shaft 12 which allows for the rotational motion to be transmitted to the drive line. Referring again to FIGS. 5–6 and as is best shown in FIG. 6, inner joint assembly 44 further has three circumferentially distributed radial cylindrical arms 52, which are generally offset by 120° and are connected to each other via inner race 46.

A boot 56 is shown as part of constant velocity joint 14. Boot 56 is a flexible cover made generally of elastomeric rubber, thermoplastic or urethane. Boot 56 shields inner cavity 34 of outer race 30 from contaminants and other foreign objects.

As discussed, inner joint assembly 44 has three equally circumferentially spaced and radial extending arms 52. Each arm 52 is adapted to extend into a corresponding recess 38 as shown in FIG. 6. As is well-known in the art, inner joint 46 is commonly referred to as having a spider-shaped or star-shaped cross section, due to its circumferentially, equally distributed, radially extending arms 52. Each arm 52 corresponds to and radially extends into respective recess 38 between oppositely disposed longitudinal tracks 42. Each recess 38 of outer race 30 is engaged by a corresponding arm 52. Depending on the variety of tripod joint, arm 52 may have a partial spherical outer surface 56 as shown in FIGS. 5–6. Of course, arm 52 may also have a cylindrical outer surface as do other types of plunging tripod joints well known in the art. In the embodiment shown in FIGS. 4–5, arm 52 may also be referred to as a trunnion 54, characterized by its partial spherical exterior surface portion 56.

Referring now to FIGS. 5 and 6, each trunnion 54 of inner joint 46 further includes a roller assembly 50 provided thereon. Each roller assembly 50 includes a roller 60. Roller 60 has an outer surface 62 rollingly engaged with a respective longitudinal track 42 of outer race 30. Each roller assembly 50 is axially and angularly movable relative to an arm 52 axis.

Again, it must be noted that there exists various types of tripod roller assemblies which may associate with a given inner joint arm, and just one of these designs is described herein for illustrative purposes only. It is fully intended that the invention herein should be applicable to any constant velocity joint. Specifically with regard to tripod universal joint 14 illustrated in FIGS. 1–5, each roller assembly 50 includes an annular roller carrier 64 (or inner roller) which contacts and is pivotally positioned on spherical outer surface 56 of trunnion 54. In FIGS. 5 and 6, roller 60 is rotatably held on roller carrier 64. As shown in FIG. 6, roller carrier 64 has a cylindrical inner face 57 to hold trunnion 54 so as to be articulatable and radially displaceable relative to trunnion 54.

Roller assembly 50 is positioned in sliding engagement with the partially spherical exterior surface portion 56 of trunnion 54. Each roller assembly 50 further includes a plurality of needle rollers 66 disposed between roller carrier 64 and roller 60. Roller carrier 64 an d roller 60 are provided with flanges 67 and 68, respectively, which form a pocket to retain the plurality of needle rollers 66 without the use of snap rings. The plurality of needle rollers 66 (bearing means) are in rolling contact with inner cylindrical surface 69 of roller 60 and outer cylindrical surface 65 of roller carrier 64.

With constant velocity joint 14 rotating in the articulated condition, there occurs, with reference to inner joint assembly 44, a radially oscillating movement of rollers 60 relative to joint axis 32 and a pivoting movement of rollers 60 on arms 52. At the same time, with reference to outer race 30, there occurs longitudinally extending oscillating rolling movement of rollers 60 along tracks 42. The first mentioned radial and pivoting movements are accompanied by sliding friction. The next mentioned rolling movement predominantly occurs in the form of rolling contact movement.

As previously discussed, roller 60 engagingly rides on corresponding tracks 42 in each recess 38. Each longitudinal recess 38 traps roller assembly 58 in recess 38 and allows only movement of roller assembly 58 along a path which is generally parallel to axis 32. Skewing of roller assembly 58 relative to longitudinal track 42 is thus minimized. Each roller 60 is pivotable and radially displaceable relative to its respective trunnion 52. In the radial interior of roller assembly 58, the two halves of track 42 each include a shoulder 63 of which, on the radial inside, supports roller 60. As was previously mentioned, inner surface 57 of roller carrier 64 is in sliding contact with the spherical exterior surface portion 56 of trunnion 54.

According to the teachings of the present invention and as fully illustrated in FIGS. 2–4, constant velocity joint 14 includes a vent regulator device 70 for regulating the ingress and egress of fluid and air from the inside of constant velocity joint 14 during both rest and operation. Device 70 is positioned adjacent a vent hole 72 formed in greasecap 36. Specifically, vent regulator device 70 is formed of a rubber or elastomeric material having sufficient rigidity to achieve the goals and objects of the present invention.

Vent regulator 70 is specifically shown in the embodiment of FIGS. 2–4 as a member having a curved portion. However, vent regulator 70 may take various shapes and forms. In operation, vent regulator 70 engages or covers the vent hole 72 positioned in greasecap 36, thereby retaining and preventing grease or other internal joint lubricant from escaping from constant velocity joint 14. The engagement of vent regulator 70 and vent hole 72 is best illustrated in FIG. 2.

Vent regulator 70 is adapted for use in a constant velocity joint 14 which includes housing or outer race 30 having an inner surface 33 defining an inner cavity 34. Inner surface 33 includes an annular portion 40 and a dome portion 36. As previously stated, dome portion 36 has a relatively small vent hole, 72 located therein which is preferably centrally located therein, preferably concentric with axis 32. Vent regulator 70 comprises a body portion having a fixed end 74 and a free end 76. A curved portion 78 is also disposed between fixed end 74 and free end 76. Fixed end 74 is shown mounted to annular portion 40 of inner surface 33 of outer race 30. Fixed end 74 may be attached to inner surface 33 via an adhesive joint or keyway or other mechanical means which does not conflict with the teachings according to the present invention.

As is best shown in FIGS. 2–3, free end 76, is disposed proximate vent hole 72. As described and shown herein in association with FIGS. 2 and 4, free end 76 is named for its ability to move radially away from vent hole 72. While in a preferred embodiment, free end 76 is not attached to outer race 30, it is contemplated that free end 76 may be mounted to greasecap 36 in a manner such that it is still free to move radially away from vent hole 72 under the appropriate circumstances, such as through the use of an attachment to ball bearings in a keyway in greasecap 34. For a typical constant velocity joint 14, vent hole 72 is approximately 1.0 to 1.5 mm in diameter. Regulator member 70 is approximately 8–10 mm wide, or of a width sufficient to securely cover and overlap vent hole 72 as shown specifically in FIG. 3.

Referring particularly to FIGS. 2 and 3, accordingly, when constant velocity joint 14 is in one of either a static state at rest, or is in an active state rotating at speeds below a predetermined threshold, free end 76 of member 70 securely covers vent hole 72 in an overlapping manner thereby preventing grease or other internal joint lubricant from penetrating vent hole 72 or exiting joint therethrough. Previously, grease was able to exit the constant velocity joint through the hole, resulting in a loss of grease. Grease or a combination of grease and dirt was also sometimes able to block the vent hole thus preventing venting of the joint, resulting in increase pressure buildup inside the joint which could lead to failure. In such situations, maintenance and replacement costs could be increased.

However, now with reference to FIG. 4, when constant velocity joint 14 is in an active state rotating at speeds above the predetermined threshold, centrifugal forces cause the grease or other internal joint lubricant to move radially away from center of joint (like axis 32) and away from vent hole 72, thereby exposing vent hole 72. Likewise, during this rotation at speeds above the predetermined threshold, centrifugal forces also act upon member 70, causing free end 76 of member 70 to move radially away from vent hole 72, thereby allowing the venting of air therethrough. In the embodiment illustrated in the accompanying drawings where propeller shaft adaptor 16 is attached to constant velocity joint 14, a vent hole 80 is also included in propeller shaft adaptor 16 which allows a conduit for constant velocity joint 14 to vent to atmosphere. Such movement of member 70 is also shown in phantom in FIG. 2. As shown in FIG. 4, centrifugal forces acting upon member 70 accordingly cause curved portion 78 to move radially outward.

The aforementioned predetermined speed is typically in a range from 2000 to 2800 revolutions per minute (rpm) and more preferably in the range between 2200 and 2600 rpms. However, these ranges are only illustrative of a typical constant velocity joint, and may vary depending on the size of the joint and the use to which it is applied, among other factors.

Vent regulator 70 prevents grease from escaping the joint by only allowing venting to occur when the joint is rotating at some significant speed, during which time the grease is centrifuged radially away from vent hole 72.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A vent regulator device adapted for use in a constant velocity joint including a housing having an inner surface defining an inner cavity, the inner surface including an annular portion and a domed portion, the domed portion having a vent hole centrally located therein, the vent regulator device comprising:

a body portion having a first end and a second end, the first end mounted to the inner surface of the housing and the second end disposed proximate the vent hole, wherein when the constant velocity joint is rotating at speeds below a predetermined threshold, the second end of the body portion covers the vent hole thereby preventing air or grease from escaping from the hole, and when the constant velocity joint is in an active state rotating at speeds above the predetermined threshold, centrifugal forces cause the second end of the body portion to move radially away from the vent hole to allow venting of air therethrough.

2. The device of claim 1, wherein the vent regulator device is formed of an elastomeric material.

3. The device of claim 1 wherein the predetermined threshold speed is in a range between 2000 and 2800 revolutions per minute.

4. The device of claim 1 wherein the predetermined threshold speed is in a range between 2200 and 2600 revolutions per minute.

5. The device of claim 1 further comprising a curved portion disposed between the first end and the second end.

6. The device of claim 1 wherein the first end is mounted to the annular portion of the inner surface of the housing.

7. A constant velocity joint assembly comprising:

an outer race defining a cavity therein, the outer race having an exterior surface and an interior surface defining an annular portion and a domed portion, the domed portion having a small vent hole formed therein;

an inner joint assembly disposed within the cavity and rotatable relative to the outer race;

a vent regulator device including a body portion, the body portion having a first end attached to the inner surface and a second end disposed proximate the domed portion;

wherein when the constant velocity joint is rotating at speeds below a predetermined threshold, the second end covers the small vent hole preventing ingress or egress of air therethrough, and when the constant velocity joint is in an active state rotating at a speed above the predetermined threshold, centrifugal forces act on the vent regulator device causing the second end to move radially away from the vent hole to allow venting of air from the cavity of the constant velocity joint.

8. The constant velocity joint of claim 7 wherein the vent regulator device is formed of an elastomeric material.

9. The constant velocity joint of claim 7 wherein the predetermined threshold speed is in a range between 2000 and 2800 revolutions per minute.

10. The constant velocity joint of claim 7 wherein the predetermined threshold speed is in a range between 2200 and 2600 revolutions per minute.

11. The constant velocity joint of claim 7 further comprising a curved portion disposed between the first end and second end.

12. A propeller shaft assembly for a motor vehicle, comprising:

a propeller shaft having an end; and at least one plunging, tripod constant velocity joint articulatably mounted to the end of the propeller shaft, including:

(a) an outer race having three circumferentially distributed longitudinally extending, axis-parallel recesses, each recess having a pair of oppositely disposed longitudinal tracks, the outer race an interior surface defining an annular portion and a domed portion, the domed portion having a relatively small vent hole formed therein;

(b) an inner joint disposed within the outer race, the inner joint having a cross section with three circumferentially distributed radially extending arms, each arm corresponding to a respective recess and radially extending into a respective recess between the oppositely disposed longitudinal tracks;

(c) a roller assembly on each arm, each roller assembly rollingly engaged with the longitudinal track of the outer race and axially and angularly movable relative to an arm axis; and (d) a regulator having a fixed end mounted to the interior surface and a free end disposed adjacent the vent hole, wherein when the inner joint is in one of either a static state and an active state rotating at speeds below a predetermined threshold, the free end covers the vent hole preventing ingress or egress of air therethrough, and when the inner joint is in an active state rotating at speed above a predetermined threshold, centrifugal forces act on the regulator causing the free end to move radially from the vent hole to allow venting of air pressure from the interior of the constant velocity joint.

13. The propeller shaft assembly of claim 12 wherein the regulator is formed of an elastomeric material.

14. The propeller shaft assembly of claim 12 wherein the predetermined threshold speed is in a range between 2000 and 2800 revolutions per minute.

15. The propeller shaft assembly of claim 12 wherein the predetermined threshold speed is in a range between 2200 and 2600 revolutions per minute.

16. The propeller shaft assembly of claim 12 further comprising a curved portion disposed between the fixed end and free end.

17. The propeller shaft assembly of claim 12 wherein the fixed end of the regulator is mounted to the annular portion of the interior surface.

* * * * *